United States Patent
van Haaren et al.

(10) Patent No.: US 11,291,153 B2
(45) Date of Patent: Apr. 5, 2022

(54) METHOD FOR PLANNING THE WORKING OF AN AGRICULTURAL FIELD

(71) Applicant: LEMKEN GmbH & Co. KG, Alpen (DE)

(72) Inventors: Josef van Haaren, Kalkar (DE); Marco van den Boom, Xanten (DE)

(73) Assignee: LEMKEN GmbH & Co. KG, Alpen (DE)

( * ) Notice: Subject to any disclaimer, the term of this patent is extended or adjusted under 35 U.S.C. 154(b) by 365 days.

(21) Appl. No.: 16/492,657

(22) PCT Filed: Mar. 9, 2018

(86) PCT No.: PCT/DE2018/100217
§ 371 (c)(1),
(2) Date: Sep. 10, 2019

(87) PCT Pub. No.: WO2018/166561
PCT Pub. Date: Sep. 20, 2018

(65) Prior Publication Data
US 2021/0136994 A1 May 13, 2021

(30) Foreign Application Priority Data
Mar. 17, 2017 (DE) .................... 10 2017 105 773.0

(51) Int. Cl.
*A01B 79/00* (2006.01)
*A01B 63/00* (2006.01)
(Continued)

(52) U.S. Cl.
CPC .......... *A01B 79/005* (2013.01); *A01B 63/002* (2013.01); *G05D 1/0219* (2013.01); *A01B 69/008* (2013.01); *G05D 2201/0201* (2013.01)

(58) Field of Classification Search
CPC ... A01B 79/005; A01B 63/002; A01B 69/008; G05D 1/0219; G05D 2201/0201
See application file for complete search history.

(56) References Cited

U.S. PATENT DOCUMENTS 2,789,649 A * 4/1957 Setzer .................. G05D 1/0229
180/204
3,128,840 A * 4/1964 Barrett, Jr. ........... G05D 1/0265
180/167
(Continued)

FOREIGN PATENT DOCUMENTS

DE    102004027242 A1   12/2005
DE       10039600        1/2016
(Continued)

*Primary Examiner* — Tara Mayo-Pinnock
(74) *Attorney, Agent, or Firm* — Smartpat PLC

(57) ABSTRACT

A method for planning the cultivation of an at least quadrangular area of an agricultural field is presented. The area has edge sections between its corners, including a first edge section and a second edge section. The second edge section is arranged opposite of and oblique to the first edge section. A plurality of first working paths and a plurality of second working paths are determined. A lane that runs at least partially along the first working paths and the second working paths and along which an agricultural machine is to be moved over the area is determined. A plurality of turning points along the lane at which the machine is steered is determined, such that the lane runs less along the first working paths and further along the second working paths as the distance from the first edge section increases.

21 Claims, 2 Drawing Sheets

(51) Int. Cl.
*G05D 1/02* (2020.01)
*A01B 69/04* (2006.01)

(56) References Cited

U.S. PATENT DOCUMENTS

| | | | | |
|---|---|---|---|---|
| 4,700,301 | A | * | 10/1987 | Dyke ........................ G01S 5/16 |
| | | | | 180/169 |
| 4,769,700 | A | * | 9/1988 | Pryor .................. A01B 69/008 |
| | | | | 348/120 |
| 6,088,644 | A | | 7/2000 | Brandt et al. |
| 2005/0273253 | A1 | | 12/2005 | Diekhans et al. |
| 2006/0175541 | A1 | | 8/2006 | Eglington et al. |
| 2007/0021913 | A1 | | 1/2007 | Heiniger et al. |
| 2010/0262342 | A1 | | 10/2010 | Dix et al. |
| 2015/0331423 | A1 | | 11/2015 | Volger et al. |

FOREIGN PATENT DOCUMENTS

| | | | | |
|---|---|---|---|---|
| DE | 102015204768 A1 | | 9/2016 | |
| EP | 0906720 A1 | * | 4/1999 | ......... A01D 41/1278 |
| EP | 2238819 A1 | | 9/2012 | |
| EP | 2236020 B1 | | 10/2012 | |
| EP | 2918155 B1 | | 9/2015 | |
| GB | 2124798 A | * | 2/1984 | ........... G05D 1/0259 |
| WO | 2014105280 A1 | | 7/2014 | |

\* cited by examiner

METHOD FOR PLANNING THE WORKING OF AN AGRICULTURAL FIELD

TECHNICAL FIELD

This disclosure relates to a method for planning the cultivation of an at least quadrangular area of an agricultural field by a steerable or controllable agricultural machine. This disclosure also relates to a corresponding method for the cultivation of an agricultural field, to a device for controlling an agricultural machine, to an agricultural machine, to a computer program product for executing the method, and to a system for remotely supporting the planning method.

BACKGROUND

Especially when cultivating non-rectangular fields, it is important to develop a strategy for cultivating the field in order to keep such cultivation as efficient as possible. Having to spend too much time cultivating the field should be avoided. Furthermore, the uneven cultivation of a field is often negative with regard to the use of the soil, because, for example, different cultivation intensities of the soil depending on the planned use can result in a cultivation intensity that is in part too strong and in part too weak. Thus, it is a concern of the farmer to cultivate efficiently and to a high standard, in order to obtain the best possible yield at the lowest possible cost.

Several state-of-the-art systems that pursue different philosophies are known. For example, document DE 10 2004 027 242 A1 discloses a route planning system for agricultural machinery with a defined working width, which defines lanes in a territory. A method is known from document EP 2 238 819 B1, with which the working width of the agricultural machine is changed along the lane, in order to adapt to the external dimensions of the field to be cultivated. Thereby, the working width of the agricultural machine is continuously changed, such that, in each case, fan-shaped lanes are created. In this manner, it is possible to ensure that the agricultural machine can use the entire length of its passage for cultivation, thus avoiding unwanted "empty runs". A similar principle can also be found in other prior art documents such as DE 10 2015 204 768 A1, EP 2 236 020 B1 or EP 2 918 155 A2.

An example of an agricultural machine with an adjustable working width is disclosed in German patent application DE 100 39 600 A1. Such machines are generally known to an expert.

A disadvantage of the fan-shaped cultivation of a non-rectangular field, which is known from the prior art, is that, due to the fan shape, or more precisely due to the constantly changing working width that leads to the fan shape, uneven soil cultivation takes place if the agricultural machine is, for example, a plow or similar device. When plowing, for example, the granularity of the cultivated soil varies from coarse-grained to fine-grained—depending on the situation, to a considerable extent. In the case of a field sprayer or another application device, the continuous change in working width associated with the fan shape may result in a varying density of the material applied.

In addition, fan-shaped cultivation requires a large number of switching and steering operations, because the working width must change virtually continuously over at least a very large part of the course of the lanes or over the entire course of the lanes. This leads, for example, to increased wear and therefore higher operating costs.

SUMMARY

Thus, one task of the present disclosure is to provide a method with which a non-rectangular field can be cultivated efficiently, uniformly and with low wear. Furthermore, one of the tasks of this disclosure is to provide a device for carrying out such a method and a device for carrying out a planned cultivation that is in accordance with the method.

The task is achieved by the subject matter of the independent patent claims. Advantageous designs are subject of the dependent claims.

A method for planning the cultivation of an at least quadrangular area, i.e. an area having four or more corners, of an agricultural field a steerable or controllable agricultural machine is presented. The at least quadrangular area has edge sections between its at least four corners including a first edge section and a second edge section. The second edge section is arranged opposite the first edge section, and is oblique to the first edge section. The method comprises the following steps:
 (a) determining a plurality of first working paths running next to each other in parallel with or equidistant from the first edge section and determining a plurality of second working paths running next to each other in parallel with or equidistant from the second edge section,
 (b) determining a lane that runs at least partially along the first working paths and the second working paths and along which the agricultural machine is to be moved from the first edge section over the area to the second edge section in order to cultivate the area,
 (c) determining a plurality of turning points along the lane at which the machine is steered from a direction along one of the first working paths into a direction along one of the second working paths or from a direction along one of the second working paths into a direction along one of the first working paths, such that a length of the lane along the first working paths decreases as a distance from the first edge section increases and at length of lane along the second working paths increases as a distance from the second edge section decreases.

The "corners" of the area designated as at least quadrangular may be rounded or pointed and the "edge sections" of the area may have slight curvatures, so they need not follow a straight line. However, it is preferred that the edge sections run along a straight line.

Furthermore, it is possible that the method is used to cultivate a more-than-quadrangular area, for example a hexagonal, octagonal, decagonal, etc. area, but also a pentagonal, heptagonal, nine-sided, etc., area of an agricultural field. In such a case, for example, it is possible to divide the area into a plurality of quadrangular areas, wherein individual "corners" can also be used several times. In other words, individual points along the edge of the area can be defined simultaneously as "corners" of different quadrangular areas.

The "area" of the agricultural field defines the entire agricultural field or only a sub-area of the field, which then also has one or more additional areas. In the case of a complexly contoured field, it may be necessary to divide the field into a plurality of quadrangular or more-than-quadrangular areas, which either may merge directly into one another or may be spaced apart.

Within the context of this disclosure, the second edge section being "arranged opposite the first edge section" means that the first edge section and the second edge section are not directly adjacent to each other; that is, they have no common corner point connecting them.

The lane runs "at least partially" along the first working paths and the second working paths, such that it can also run over part of the field exclusively along one of the two working paths. However, if the first and second edge sections are oblique to each other (that is, not parallel to each other), at least part of the lane within the area must run only in part along one of the first working paths and in the complementary part along one of the second working paths.

Preferably, the lane first runs along one of the first working paths, then along one of the second working paths, and, depending on the contour of the area after a turning maneuver, for example over a headland, initially in the opposite direction along one of the second working paths and then once again along one of the first working paths, or depending on the contour of the area without a turning maneuver, along one of the third working paths, which can be defined, for example, by an edge section of a second area adjacent to the area.

The "direction along one of the first working paths" or the "direction along one of the second working paths" can be defined, for example, by their parallelism to the first working path or second working path, as the case may be, or to the first edge section or second edge section, as the case may be.

The "distance" from the first or second edge section, as the case may be, is understood to be a distance measured essentially perpendicular to the edge section. Ideally, the agricultural machine should be located at a distance from the first or second edge section, as the case may be, that is determined by the number and width of the first or second working paths, as the case may be, between itself and the respective edge area. The proportion of the first or second working path, as the case may be, in the lane increases the closer the machine is to the corresponding edge section.

In this manner, it is possible to initially minimize the number of switching and steering operations when using the machine. In addition, the disclosed planning of the cultivation makes it possible to achieve a more uniform soil cultivation, without having to accept a noticeably lower efficiency compared to the fan-shaped cultivation known from the prior art. This means that the quality of soil cultivation can be improved first and foremost, as can the cost-effectiveness of cultivation with regard to reduced wear.

In a preferred embodiment, the turning points along the lane are determined so that they lie on a diagonal connecting the first edge section and the second edge section.

A "diagonal" in this case means a line that connects two corners of the first and second edge sections to each other, thereby extending over the area bounded by the edge sections in such a manner as to divide the area into two parts. By means of the diagonal, two triangular areas can be defined from the quadrangular area, which triangular areas abut against each other along the diagonals.

If the turning points essentially lie on the diagonals, the distribution of the proportions of the lane along the first working paths and along the second working paths is optimal for cultivating the area. However, it is also possible to position the turning points differently than on the diagonal, for example if operational reasons in the operation of the machine or the topography of the ground indicate otherwise. For this purpose, it is also preferred to define a surface area around the diagonal within which the turning points lie. For example, the surface area can be determined by a certain maximum distance from the diagonal.

In accordance with a preferred embodiment, the working width of the machine can be changed between at least two different values during cultivation. In such preferred embodiment, preferably one switching point, or more preferably multiple switching points, are determined along the lane at which the working width of the machine is started to be changed from one of the at least two values to another of the at least two values.

In this connection, a "working width" is understood to mean an actual working width, but also an effective working width, which may differ from the actual working width. The actual working width is important, for example, in the case of a plow that cultivates a soil strip of a certain width. An effective working width can be defined in particular for distributors, field sprayers and the like, with which, for example, only a part of the total width of the device is switched on while another part of the possible (actual) working width of the device is disabled.

After starting to change the working width of the machine from one value to the other, it is possible to obtain a continuous transition between working paths of different widths, thus cultivating the area over the full surface, with little overlap. The duration of the transition time (that is, the time that elapses when the working width of the machine is changed from one value to the other) can preferably be set depending on the forward speed of the machine. This preferred feature allows a particularly uniform and efficient cultivation of the area, since, due to the change, the working width doubles and the uncultivated surfaces of the area are largely excluded.

Alternatively, it is also possible to carry out the method with a machine without an adjustable working width. With working paths of different widths, in such a case, the overlapping (double) cultivation of the edge areas of the narrower working paths can take place, or individual strips in the area of the wider working paths can be omitted (not cultivated).

In a preferred embodiment, the machine can be coupled to a tractor or carrier and is configured in particular as a soil cultivation implement or as a distribution device, preferably as a plow, a cultivator, a disk harrow, a driven soil cultivation implement, a seeder, a field sprayer or a fertilizer spreader. The machine can also be self-propelled or coupled to a robot or the like. If the machine is coupled to a tractor, a carrier or a robot or the like, the combination of the at least two devices may also be regarded as the "machine" within the context of this disclosure. For example, a plow coupled to a tractor can be regarded as the machine. "Coupling" can be, in particular, an attaching, extending, semi-mounting or pulling.

It is advantageous that the surface of the area has the shape of a trapezoid, especially a rectangular trapezoid. In the vast majority of cases, a field can be divided in such a manner that it is made up of essentially trapezoidal areas. Thereby, the areas can be supported by a cartographic reproduction of the field, in particular a satellite image, a map or corresponding vectors.

Within the context of this disclosure, "trapezoid" means a surface having at least two sides that are essentially parallel to each other. Within the context of this disclosure, an angle of up to 10 degrees between the two sides is acceptable in order to still be considered "essentially parallel." In this connection, a "rectangular trapezoid" is a trapezoid that has at least one internal right angle. For carrying out the method, it is not absolutely necessary that the area has two essentially parallel sides. With a trapezoidal shape, however, it may be easier to determine the lane.

The machine preferably has a positioning device, in particular a device for the determination of position based on signal propagation delay or supported by satellites. Examples of such positioning devices are based on the satellite navigation systems known as GPS, GLONASS, GALILEO; however, a wheel sensor, a laser, radar, an inertial sensor, a rotation rate sensor, a gyroscope or a camera can also be used to determine the position of the machine. Such a positioning device allows the machine to be programmed into the lane and, if necessary, when carrying out cultivation, the machine can determine whether or not it is on the desired course or has deviated from the intended lane, in order to, if necessary, recommend or undertake corrective steering.

However, it is also possible to dispense with such a positioning device if, for example, the position of the machine is known by other means or if the machine moves between known reference points that allow conclusions to be drawn as to whether or not the intended lane has been maintained. The required accuracy of the determination of a position varies according to the area of application. Accordingly, suitable (that is, sufficiently accurate) positioning devices can be selected, or a special device for the determination of position can be dispensed with.

In a preferred embodiment, the position and/or alignment of at least one of the edge sections of the area, preferably all at least four edge sections of the area, is determined by traversing the at least one edge section, preferably all at least four edge sections of the area, in particular by means of the machine. In principle, the position and/or alignment of the edge sections can also be determined in a manner different than traversing. For example, map material can be relied on, or the edge section can be measured by walking over with a receiver. However, particularly preferably, the machine itself is designed for traversing one or more edge sections, because this can already be used, for example, to cultivate the edge section during traversing and thus to determine the position and/or alignment of the edge section particularly efficiently. However, it is also possible to use a tractor or a special measuring vehicle or another vehicle in addition to walking over.

If only one edge section is determined in terms of its position and/or alignment by means of traversing, it is preferably the target edge section; that is, the edge section on whose opposite side the cultivation of the area is started. The start of the cultivation of the area on the opposite side then gives rise to the start sections. Alternatively, the entire field or area of the field, as the case may be, can be traversed during an initial cultivation or separately driven around, and the field or area, as the case may be, can then be subdivided into individual areas, to the extent that the entire field does not yet have the form of an area suitable for this method. Curved edge sections can at least approximately be divided into a series of straight edge sections by means of polygonalization. Depending on the radius of curvature and the length of the respective edge section, this is advantageous for carrying out the method.

It is advantageous to carry out at least one of the steps with a time delay to cultivate the area. In other words, this means that, preferably, at least one step in the planning of the cultivation is not carried out during the cultivation, but prior to it, for example in order to optimally determine the required time or material to be applied.

In a preferred embodiment, the machine comprises at least two machine units, which can be used separately in spatially different sub-areas of the area. A robot swarm is an example of machine units which complement one another to form a machine. Thereby, it is preferable that each of the machine units has a unit working width that can be changed between at least two different values. It is also possible that only one of the plurality of machine units has a variable unit working width.

Preferably, the steps are carried out in such a manner that the machine units complement each other when cultivating the area. Thus, it is preferred that, during cultivation or in a manner staggered with each other, the machine units exchange information regarding the position of the lanes and regarding which machine unit is cultivating or has already cultivated which lane, such that the area can be cultivated as efficiently as possible by the plurality of machine units.

In addition, it is possible not only for a plurality of intercommunicating machine units to be located in a single area, but also for a plurality of intercommunicating machine units to be located in a plurality of composite areas and to undertake cultivation there, especially if the composite areas preferably cover the entire field. In this manner, it is particularly efficient to cultivate an existing field that can be divided into a plurality of areas within the context of this disclosure, which increases the speed of cultivation.

Furthermore, it is preferred that recordings of sub-areas of the area that are cultivated and/or still to be cultivated are used as a basis for a method for planning the cultivation of a remaining surface of the area. For example, a lane that is already cultivated of a first machine unit can be used as a target contour for a second machine unit.

A method for cultivating a quadrangular area of a field by an agricultural machine, wherein the area between its corners has edge sections including a first edge section and a second edge section opposite the first edge section, the second edge section being oblique to the first edge section, is characterized in that the area is cultivated according to a method for planning the cultivation as described above. In other words, the area is cultivated as this arises from the planning described above.

In a preferred embodiment, a deviation of a position of the machine from the lane is determined and preferably corrected. In the preferred case of a variable working width, the deviation is preferably corrected by changing the working width of the machine, wherein the position of the machine is preferably determined in a manner based on signal propagation delay and/or supported by satellites.

For the features of the machine specified in this connection, the definitions and possible variations already specified above apply. In particular, the machine may have a plurality of machine units that cultivate the area of the field separately from each other, the working width may be an effective working width or an actual working width and a variable working width may not be required.

It is further preferred that the position of the first and/or second edge section, the first and/or second working path, the lane, the switching point and/or the turning point and/or the cultivation of the area is stored according to at least one of these parameters for a downstream process, in particular a spreading operation and/or for documentation. Thereby, the specified parameter is in particular the working path, the lane, the switching point, the turning point or the respective edge section. Storing the method of cultivation on the one hand leads to the better traceability of the execution of the method and also enables better planning for further cultivating the field. In addition, such a storage of the performance of the method could create the possibility that information could be included for the future planning of the cultivation of the same area.

A device for controlling an agricultural machine for cultivating an agricultural field is characterized in that the device is configured to control the machine so that an at least quadrangular area of the field can be cultivated by the method described above.

For example, the device is programmed to carry out the method of cultivation; in particular, the turning points and/or switching points have been defined during the planning, and the corresponding actions of the machine are initiated at an appropriate time during cultivation.

An agricultural machine for cultivating an agricultural field is characterized in that the machine has a device for controlling the agricultural machine as described above.

Thus, the machine is, for example, a plow, a field sprayer or a similar machine with a control unit or, more generally, a device for controlling the machine, such that the method of cultivation, as described in this text, can be carried out by the machine.

Preferably, the working width of the machine can be changed between at least two different values during cultivation. Such a machine is preferred because it permits the particularly efficient cultivation of the area by allowing optimum response to the planned working width within certain limits.

A computer program product, when run on a computer, performs a method for planning the cultivation of an area of an agricultural field as described above.

Finally, the disclosure relates to a system for remotely supporting a method for planning cultivation carried out by a user, wherein at least one of the method steps can be carried out by an assistant remote from the user. In other words, the invention also relates to a system for the remote support of the planning of the cultivation of the field, for example, if the actual user of the field wants to carry out, or to have carried on his behalf, the planning of the cultivation, for example to rely on infrastructure that is not available in his spatial environment.

Additional features and advantages of the invention arise from the following description of figures and the entirety of the patent claims.

DETAILED DESCRIPTION

Figure 1:
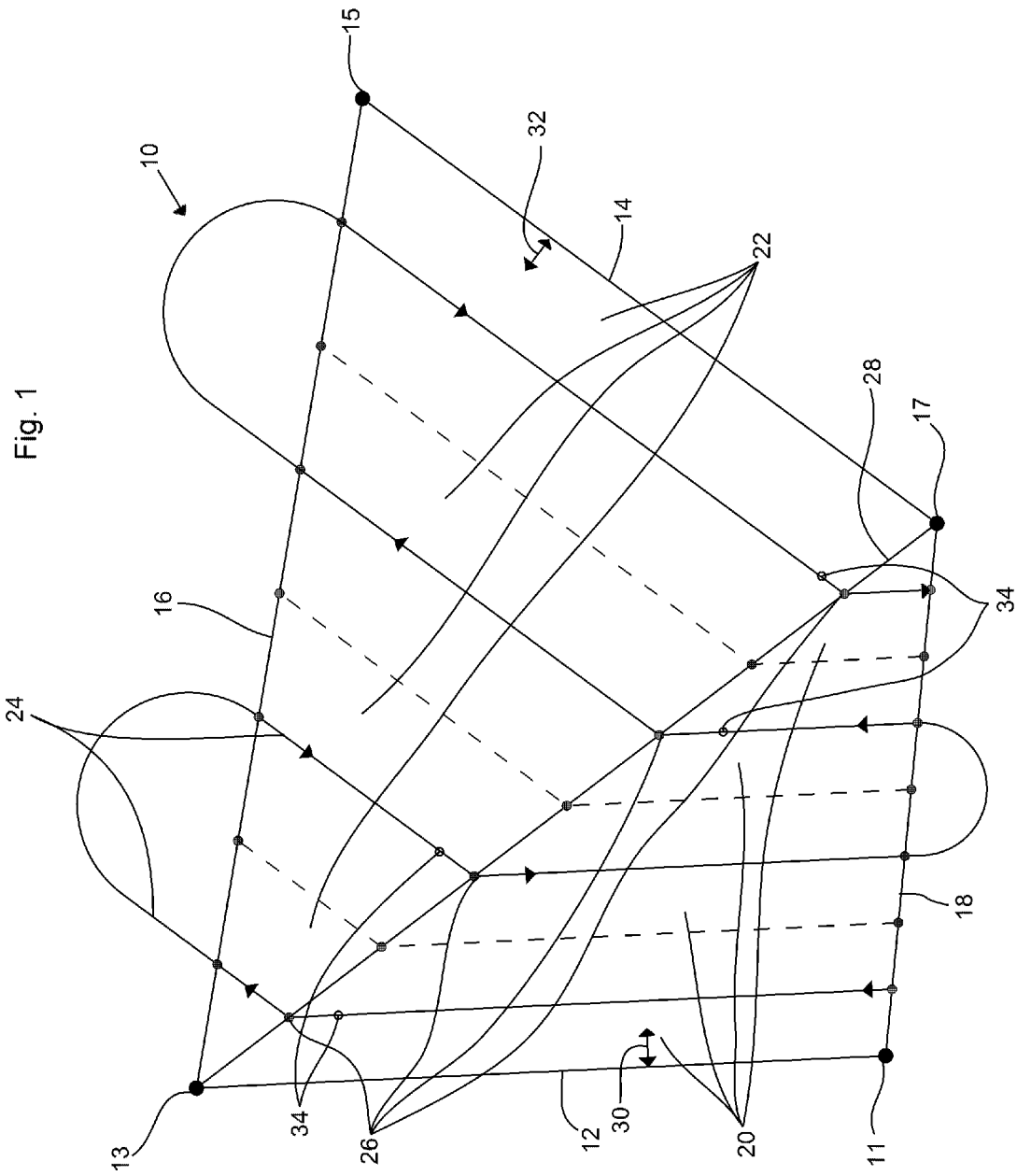
FIG. 1 shows a schematic top view of a field to be cultivated, which forms a quadrangular area.

FIG. 1 shows an example of a quadrangular area 10 of an agricultural field that is to be cultivated by means of a steerable or controllable agricultural machine. FIG. 1 shows the planning of the lane in particular.

The area 10 is initially defined by four corner points 11, 13, 15, 17, between which four edge sections 12, 14, 16, 18 extend. A first edge section 12 runs along the left edge of the area 10 and is intended to be a starting section for the cultivation of the area 10. A second edge section 14 opposite the first edge section 12 is oblique to the first edge section 12 and constitutes a target section, that is, the section at which the agricultural machine is to complete the cultivation of the area 10.

Before the first edge section 12 (that is, in FIG. 1, left of the first edge section 12) and/or behind the second edge section 14 (that is, in FIG. 1, right of the second edge section 14), the field can preferably further extend parallel to the first edge section 12 or the second edge section 14, as the case may be, such that conventional, efficient and high-quality parallel cultivation of the field is possible there until the edge of the field is reached. In other words, the area 10 preferably can be positioned between the edges of the actual field and can be used to adjust the alignment of the lanes from one edge to the other edge.

FIG. 1 shows four first working paths 20 running next to each other in parallel to the first edge section 12 and four second working paths 22 running next to each other in parallel to the second edge section 14. Each of the first working paths 20 merges into a second working path 22 along a diagonal 28 that extends between the first edge section 12 and the second edge section 14, or more precisely between the corner point 13 and the corner point 17.

A lane 24 is defined along the first and second working paths 20, 22, wherein the width of the lane over the area of the first working paths 20 or the second working paths 22, as the case may be, is the same respectively, and changes in the area of the diagonals 28 from the width of the first working paths 20 to the width of the second working paths 22 or from the width of the second working paths 22 to the width of the first working paths 20. Outside the edge sections 16, 18, which connect the first edge section 12 and the second edge section 14 to each other, a headland area (which is not drawn separately in FIG. 1) is defined. In such area, the machine can turn and enter back into the area 10.

FIG. 1 also shows turning points 26 along the lane 24 that, in the form shown in FIG. 1, lie on diagonal 28. At such turning points 26, the machine changes its direction of travel along the lane 24 from a direction along one of the first working paths 20 to a direction along one of the second working paths 22, wherein the proportion of a direction of travel along the first working paths 20 decreases relative to the proportion along the second working paths 22, the greater the distance 30 from the first edge section 12 becomes and the smaller the distance 32 from the second edge section 14 becomes.

FIG. 1 also shows switching points 34 at which the working width of the machine is started to adapt to the section of the lane 24 to be traveled on after the subsequent turning point 26. Such switching points 34 can also be arranged behind the respective turning point 26 in the direction of travel, or can coincide with the respective turning point 26. In addition, in principle, it is possible to cultivate the area 10 with one machine without a variable working width and to plan such cultivation according to the method described here. In such a case, a switching point 34 can of course be omitted.

From the difference A between a width of the first working paths 20 and a width of the second working paths 22, it is possible to determine the number of required turning points 26 and thus ultimately the required width of the area 10, in order to travel from the direction parallel to the first edge section 12 to the direction parallel to the second edge section 14. If the edge section 16 is larger than the edge section 18 by a multiple of this difference A, a corresponding number of passages and turning points 26 is required. However, it is also possible to use more turning points (that is, the minimum required number of turning points) and thus more first and second working paths 20, 22 running next to each other, in order to correct the direction. This has the advantage that the angle by which the steering must be done at the turning point 26 becomes smaller. With a machine with a variable working width, a smaller adjustment of the working width can also be used, which has the advantage, for example, of more possibilities of correction and more uniform soil cultivation.

Figure 2:
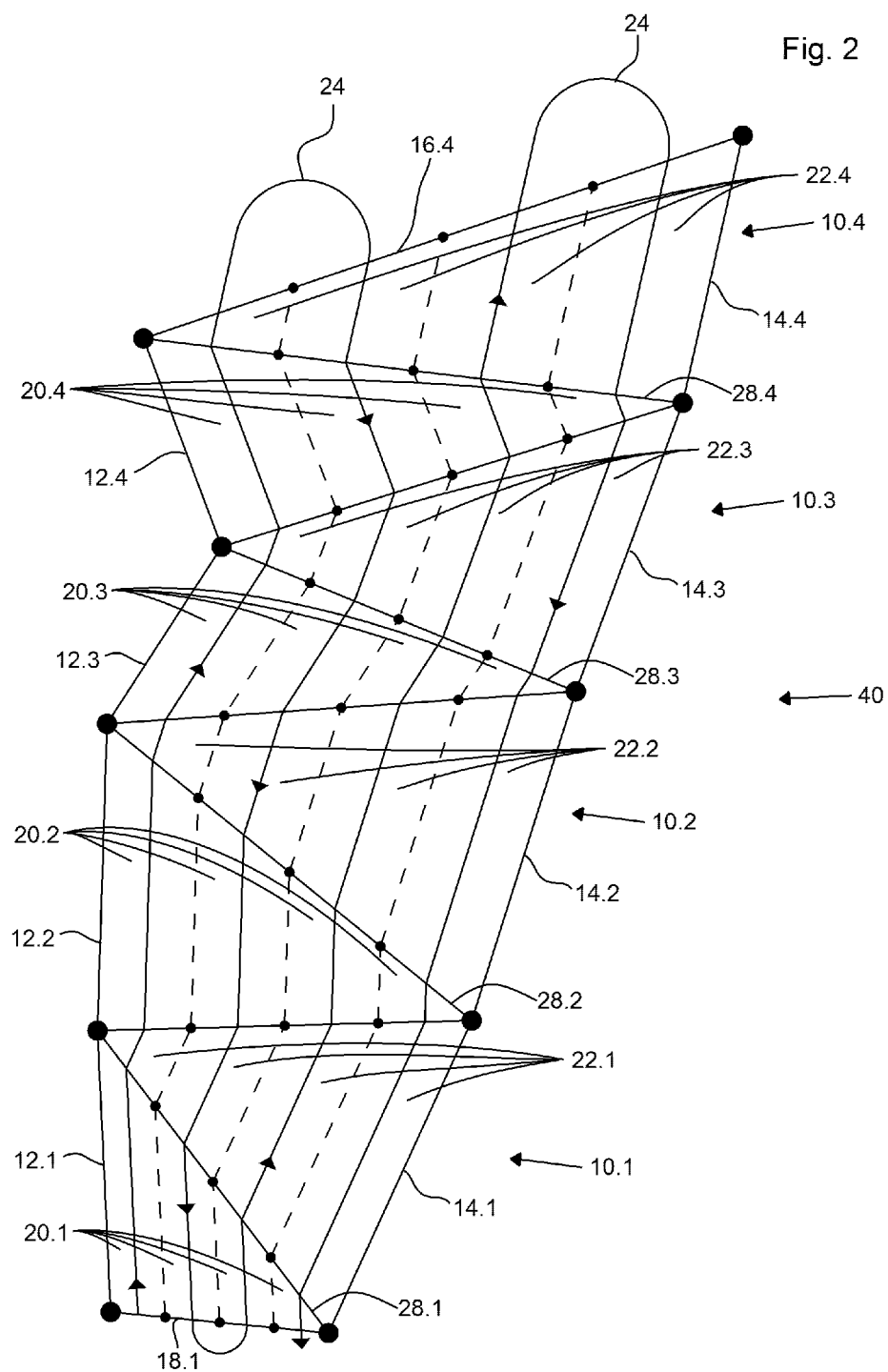
FIG. 2 shows a variant of an area to be cultivated in an agricultural field, which has ten corners in the embodiments shown in FIG. 2 and which has been divided into a plurality of areas.

FIG. 2 shows a complex, decagonal area 40, which can be divided into at least four quadrangular areas 10.1, 10.2, 10.3, 10.4, in order to be able to use the method for the efficient cultivation of the complex area 40. The respective elements of the area 40 correspond to the areas from FIG. 1 with the same reference digit, supplemented by a digit after a point, which identifies the respective area. For example, the reference signs 20.1 designate the first working paths (see first working paths 20 in FIG. 1) of the first area 10.1, while the reference signs 20.2, 20.3 and 20.4 designate the first working paths of the second, third and fourth areas 10.2, 10.3 and 10.4.

The expert also recognizes that the complex area 40 can be subdivided not only into individual areas 10.1-10.4 as shown in FIG. 2, but that other subdivisions are also possible. For example, an area that is bounded by the edge sections 12.2, 14.1 and the diagonals 28.1 and 28.2 can also be defined, wherein its "diagonal" is then formed by the "edge section" 16.1.

FIG. 2 illustrates the fact that almost any field can be subdivided into a plurality of "areas" within the context of this disclosure, such that the method can be applied to nearly any contour of a field.

This disclosure makes it possible to plan a particularly efficient and gentle cultivation of at least a quadrangular area of an agricultural field by means of a steerable or controllable agricultural machine, such that a uniform soil cultivation and a low wear of the machines involved can be achieved.

The above description of the preferred embodiments and examples serves only to illustrate but not limit the invention.

The invention claimed is:

1. A method for planning the cultivation of an at least quadrangular area (10) of an agricultural field by a steerable or controllable agricultural machine,
   wherein the area (10) has edge sections (12, 14, 16, 18) between its corners (11, 13, 15, 17) including a first edge section (12) and a second edge section (14), the second edge section (14) being arranged opposite the first edge section (12) and oblique to the first edge section (12), comprising the following steps:
   (a) determining a plurality of first working paths (20) running next to each other in parallel with or equidistant from the first edge section (12) and determining a plurality of second working paths (22) running next to each other in parallel with or equidistant from the second edge section (14);
   (b) determining a lane (24) that runs at least partially along the first plurality of working paths (20) and the second plurality of working paths (22) and along which lane (24) the agricultural machine is to be moved from the first edge section (12) over the area (10) to the second edge section (14) in order to cultivate the area; and
   (c) determining a plurality of turning points (26) along the lane (24) at which the agricultural machine is steered from a direction along one of the first working paths (20) into a direction along one of the second working paths (22) or from a direction along one of the second working paths (22) into a direction along one of the first working paths (20), such that a length of the lane (24) along the first working paths (20) decreases as a distance (30) from the first edge section (12) increases and a length of the lane (24) along the second working paths (22) increases as a distance (32) from the second edge section (14) decreases.

2. The method according to claim 1,
   wherein the turning points (26) along the lane (24) are determined so that they lie on a diagonal (28) connecting the first edge section (12) and the second edge section (14).

3. The method according to claim 1,
   wherein a working width of the agricultural machine can be changed between at least two different values during cultivation, and
   wherein one switching point (34) or multiple switching points (34) is or are determined along the lane (24) at which the working width of the agricultural machine is started to be changed from one of the at least two different values to another of the at least two different values.

4. The method according to claim 1,
   wherein the agricultural machine can be coupled to a tractor or a carrier.

5. The method according to claim 1, wherein the agricultural machine is a soil cultivation implement or a distribution device.

6. The method according to claim 1, wherein the agricultural machine is a plow, a cultivator, a disk harrow, a driven soil cultivation implement, a seeder, a field sprayer, or a fertilizer spreader.

7. The method according to claim 1, wherein the area (10) has the shape of a trapezoid.

8. The method according to claim 1, wherein the area (10) has the shape of a rectangular trapezoid.

9. The method according to claim 1, wherein the agricultural machine includes a positioning device.

10. The method according to claim 9, wherein a position and/or an alignment of at least one of the edge sections (12, 14, 16, 18) of the area (10) is determined by traversing the at least one edge section (12, 14, 16, 18).

11. The method according to claim 9, wherein positions and/or alignments of all edge sections (12, 14, 16, 18) of the area (10) are determined by traversing all edge section (12, 14, 16, 18) by the agricultural machine.

12. The method according to claim 1,
   wherein at least one of the steps (a)-(c) is carried out before the area (10) is being cultivated.

13. The method according to claim 1,
   wherein the agricultural machine comprises at least two machine units, each machine unit having a unit working width that can be changed between at least two different values,
   the at least two machine units being configured to be used separately in spatially different sub-areas of the area (10),
   wherein the steps (a)-(c) are carried out in such a manner that the at least two machine units complement each other when cultivating the area (10).

14. The method according to claim 13,
   wherein recordings of sub-areas of the area that are cultivated and/or still to be cultivated are used as a basis (10) for the method for planning the cultivation of a remaining surface of the area.

15. A method for cultivating a quadrangular area (10) of a field by an agricultural machine, wherein the area (10) has edge sections (12, 14, 16, 18) between its corners (11, 13, 15, 17) including a first edge section (12) and a second edge section (14), the second edge section (14) being arranged opposite the first edge section (12) and oblique to the first edge section (12), wherein the area (10) is cultivated in accordance with the method for planning the cultivation according to claim 1.

16. The method according to claim 15, wherein a deviation of a position of the machine from the lane (24) is determined and corrected by changing a working width of the machine.

17. The method according to claim 15, further comprising:

storing at least one of a position of the first edge section (12), a position of the second edge section (14), the first working path (20), the second working path (22), the lane (24), the turning points (26) for a downstream process.

18. A device for controlling an agricultural machine for cultivating an agricultural field, wherein the device is configured to control the machine so that an at least quadrangular area (10) of the field is cultivated by the machine, the at least quadrangular area (10) having edge sections (12, 14, 16, 18) between its corners (11, 13, 15, 17) including a first edge section (12) and a second edge section (14), the second edge section (14) being arranged opposite the first edge section (12) and oblique to the first edge section (12)

wherein the device is programmed to perform the following steps:

(a) determining a plurality of first working paths (20) running next to each other in parallel with or equidistant from the first edge section (12) and determining a plurality of second working paths (22) running next to each other in parallel with or equidistant from the second edge section (14);

(b) determining a lane (24) that runs at least partially along the first plurality of working paths (20) and the second plurality of working paths (22) and along which lane (24) the agricultural machine is to be moved from the first edge section (12) over the area (10) to the second edge section (14) in order to cultivate the area; and (c) determining a plurality of turning points (26) along the lane (24) at which the agricultural machine is steered from a direction along one of the first working paths (20) into a direction along one of the second working paths (22) or from a direction along one of the second working paths (22) into a direction along one of the first working paths (20), such that a length of the lane (24) along the first working paths (20) decreases as a distance (30) from the first edge section (12) increases and a length of the lane (24) along the second working paths (22) increases as a distance (32) from the second edge section (14) decreases.

19. An agricultural machine for cultivating an agricultural field, wherein the machine includes the device according to claim 18.

20. The agricultural machine according to claim 19, wherein a working width of the machine can be changed between at least two different values during cultivation.

21. A distributed system for cultivating a quadrangular area (10) of a field, the quadrangular area (10) having edge sections (12, 14, 16, 18) between its corners (11, 13, 15, 17) including a first edge section (12) and a second edge section (14), the second edge section (14) being arranged opposite the first edge section (12) and oblique to the first edge section (12) the distributed system comprising:

a remote computing device; and an agricultural machine, wherein the distributed system is configured to perform the following steps:

(a) determining a plurality of first working paths (20) running next to each other in parallel with or equidistant from the first edge section (12) and determining a plurality of second working paths (22) running next to each other in parallel with or equidistant from the second edge section (14);

(b) determining a lane (24) that runs at least partially along the first plurality of working paths (20) and the second plurality of working paths (22) and along which lane (24) the agricultural machine is to be moved from the first edge section (12) over the area (10) to the second edge section (14) in order to cultivate the area; and (c) determining a plurality of turning points (26) along the lane (24) at which the agricultural machine is steered from a direction along one of the first working paths (20) into a direction along one of the second working paths (22) or from a direction along one of the second working paths (22) into a direction along one of the first working paths (20), such that a length of the lane (24) along the first working paths (20) decreases as a distance (30) from the first edge section (12) increases and a length of the lane (24) along the second working paths (22) increases as a distance (32) from the second edge section (14) decreases, wherein at least one of the steps is performed in the remote computing device and wherein at least one other one of the steps is performed in the agricultural machine.

* * * * *